Figure 1:
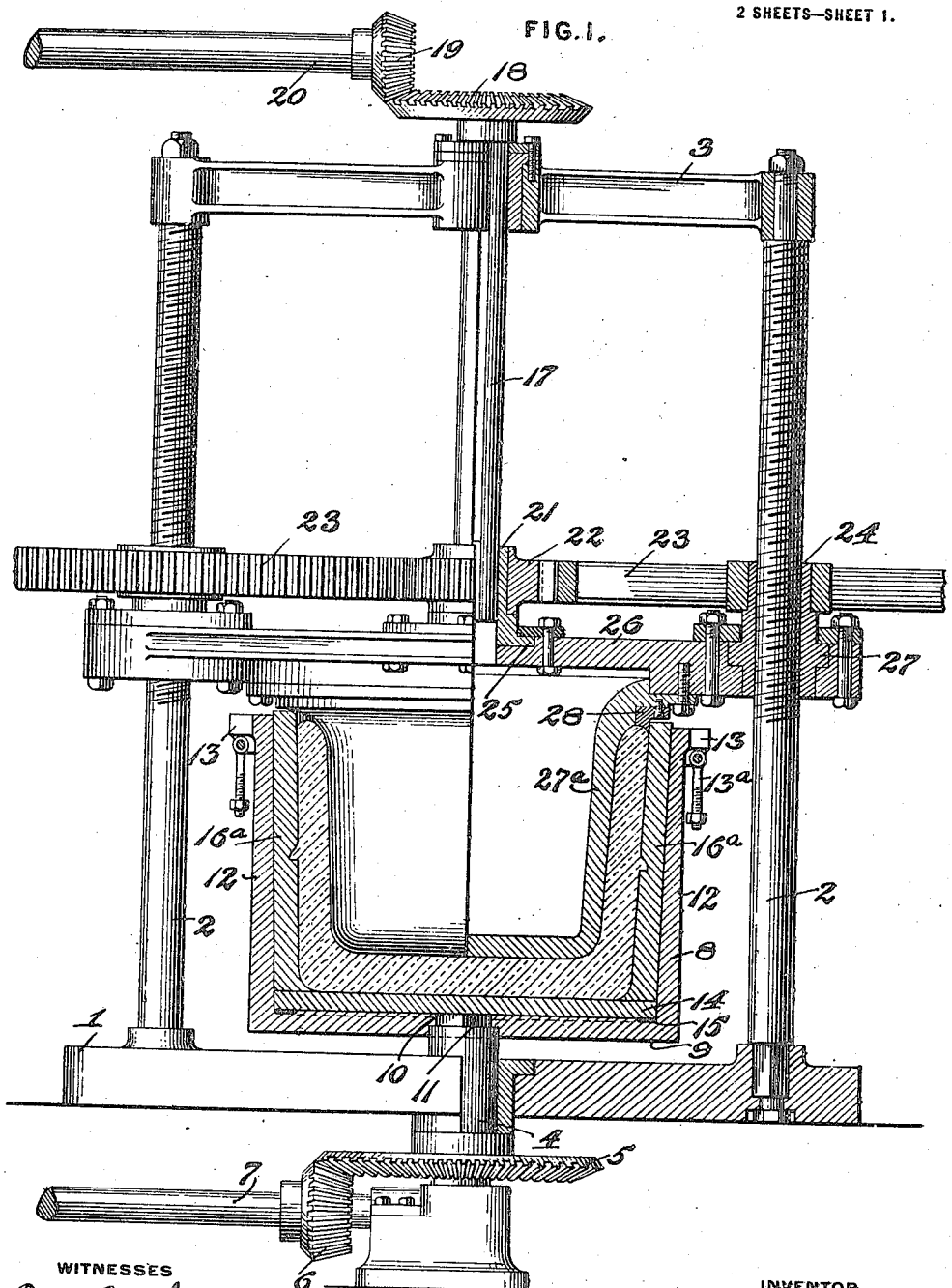

H. K. HITCHCOCK.
METHOD OF MAKING CLAY POTS OR CRUCIBLES.
APPLICATION FILED JULY 28, 1913.

1,221,450.

Patented Apr. 3, 1917.

WITNESSES

INVENTOR

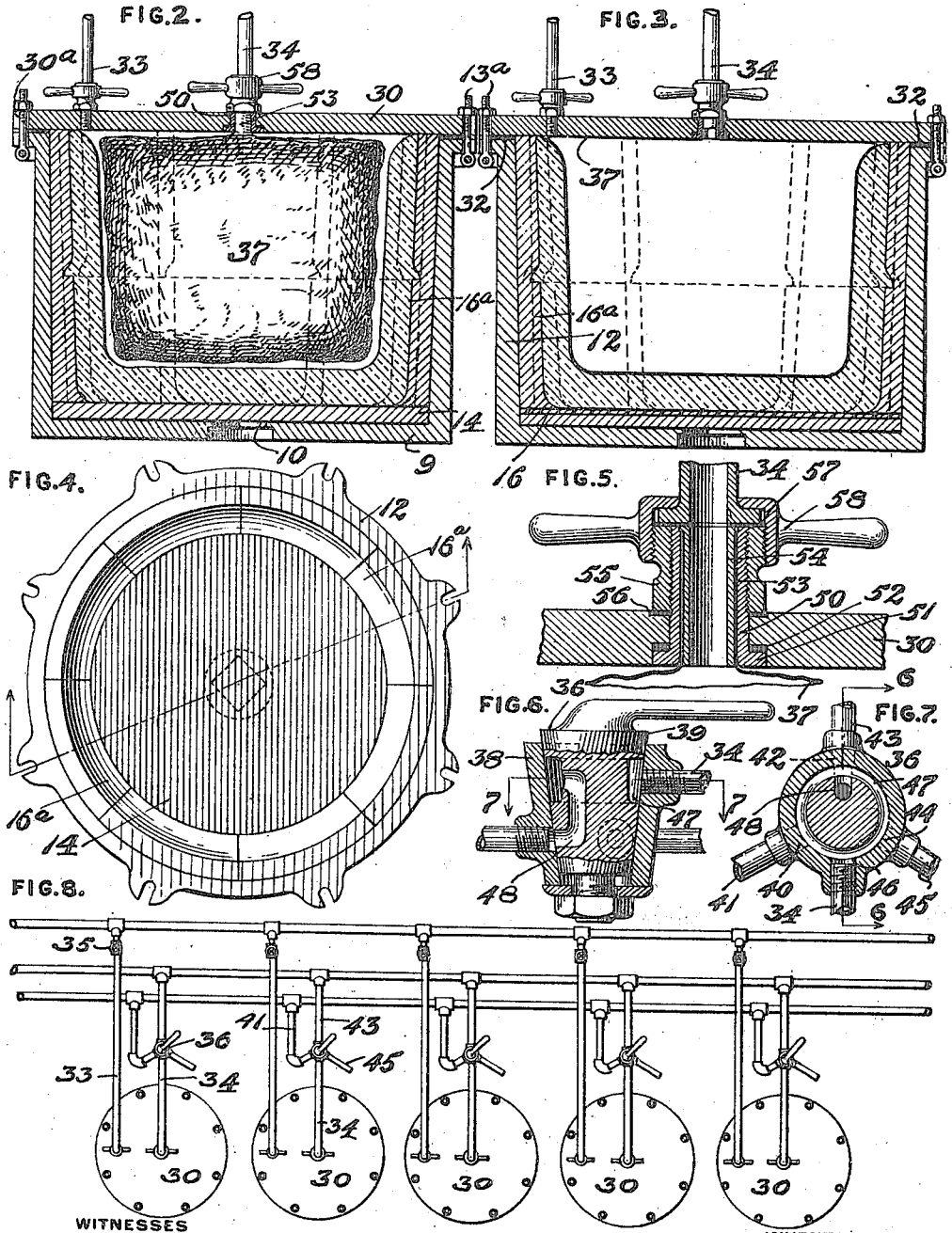

UNITED STATES PATENT OFFICE.

HALBERT K. HITCHCOCK, OF TARENTUM, PENNSYLVANIA.

METHOD OF MAKING CLAY POTS OR CRUCIBLES.

1,221,450. Specification of Letters Patent. Patented Apr. 3, 1917.

Application filed July 28, 1913. Serial No. 781,550.

*To all whom it may concern:*

Be it known that I, HALBERT K. HITCHCOCK, a resident of Tarentum, in the county of Allegheny and State of Pennsylvania, have invented a new and useful Improvement in Methods of Making Clay Pots or Crucibles, of which the following is a specification.

This invention relates to a method of making clay forms, and especially pots or crucibles for melting glass. The object of the invention is to provide an improved method for making such pots or crucibles, or other clay forms, whereby a homogeneous structure is obtained.

Pots or crucibles for melting glass have heretofore been made by a hand method consisting in building the same up from quite a number of small quantities of clay, each of which is worked carefully by hand into the already formed portion of the pot or crucible. This method entails much skilled labor, and the result depends considerably upon the personal equation of the workman.

It has been attempted to make such pots or crucibles by a combination of molding and jigging operations, using a machine similar to that hereinafter described. This, however, has not proved successful, one of the principal reasons being that the clay in the bottom of the pot has been much denser than that in the sides of the pot, causing widely different physical characteristics which have resulted in the unequal shrinking of the pot when dried and fired, and producing a very unsatisfactory article for the use for which it was intended.

It has been characteristic of both the hand made pots and those made by the molding and jigging operations, that small cells or bubbles of air have been entrapped in the clay and these had expanded under the influence of the heat and produced injurious strains in the pot walls and also destroyed to some extent the density of the pot structure and decreased its strength.

My invention comprises a method for making these pots or crucibles whereby the foregoing objections are overcome and a homogeneous and stronger structure is obtained. This result is accomplished, generally stated, by first withdrawing the air from the cells in the clay forming the walls of the pot, and then compacting the clay into a dense and homogeneous whole.

The invention comprises the several method steps hereinafter described and claimed.

In the drawings, which represent mechanism suitable for practising the invention, Figure 1 represents a view, partially in side elevation and partially in section, of a machine for molding the pot blank; Fig. 2 is a sectional elevation of the mold shown in Fig. 1, as the same is arranged for freeing the blank from bubbles of air; Fig. 3 is a similar view, illustrating the step of compressing or compacting the blank; Fig. 4 is a plan view of the mold shown in Fig. 2, the cover being omitted; Fig. 5 is a detail sectional elevation of the pipe connecting through the cover at the upper end of the expansible bag or bladder; Fig. 6 is a sectional elevation of a three-way valve taken on the line 6—6, Fig. 7; Fig. 7 is a cross sectional view of said valve on the line 7—7, Fig. 6; and Fig. 8 is a diagrammatic view of a multiple system.

According to my invention the blank to form the pot is produced in any suitable or preferred manner, preferably by a molding operation and within a mold of special construction, which is so arranged that after the blank is formed therein the mold can be bodily removed from the molding machine. Said mold is also so arranged that after the preliminary formation of the blank therein the air may be exhausted from the mold in such manner as to expand any bubbles of air or other gases occluded within the material forming the blank, whereby said air or gases will be withdrawn from the blank. This frees the blank of all hollow or weak spots and gives it a homogeneous texture. After the blank has been freed of occluded air or gas the inner surface thereof is subjected to uniform yielding pressure over its entire inner surface, and while out of contact with the air, which compacts the blank equally throughout and causes the material thereof to flow in all directions so that the blank becomes thoroughly homogeneous. This step is carried out in such manner as to prevent the blank from taking up or occluding air or gas bubbles. The mold, with the blank therein, is then carried to and placed upon a jigger, where it is rapidly rotated and the inner surface of the blank is smoothed or trimmed to the proper shape. The blank is then removed from the mold to a tray and its outer surface smoothed or trimmed in the same manner as is done at present. The blank is then allowed to dry for the proper period of time and is arched in the usual manner.

The blank may be preliminarily shaped in any suitable manner, such as in a mold or by hand, but preferably in a molding machine of the type shown. This comprises a suitable frame having a base 1 and two rigid side pillars or supports 2, which are screw-threaded and are rigidly connected at their upper ends by a cross head 3. Journaled in the base 1 is a short vertical stub shaft 4 provided on its lower end with a gear 5 meshing with a gear 6 on a drive shaft 7. Shaft 4 supports and drives the mold 8.

The mold 8 comprises a cup-shaped casing with a bottom 9 provided with a central square or non-circular opening 10 to receive the square or non-circular upper end portion 11 of shaft 4, for rotating the mold. The side wall 12 of the casing is provided at its upper edge with a plurality of ears or lugs 13 to which are pivotally connected swinging locking bolts 13$^a$ hereinafter referred to. The casing is provided with an inner bottom 14 lying on a circular gasket 15 seated in an annular channel or groove in the casing. The bottom 14 may be formed of any material, such as wood, metal or the like and, if desired, may be provided with a thin layer or lining 16 of plaster of Paris or the like, as in Fig. 3, although this is not essential. The inner side wall of the mold cavity is formed of a plurality of sections 16$^a$, each preferably formed of plaster of Paris or the like, and having the proper shape to form the outer surface of the pot.

A vertical shaft 17 is journaled in the cross head 3 and is driven, through intermeshing gears 18 and 19, by a drive shaft 20. Shaft 17 is splined to a rotatable member 21 having rigidly connected thereto a spur gear 22 which meshes with a pair of spur gears 23, each of which is connected rigidly to a nut 24 traveling on one of the fixed side pillars 2. The lower end of member 21 is provided with a flange or collar 25 rotatable in a cross rail 26, while nuts 24 are provided with similar flanges or collars 27 also rotatable in said cross rail. It will be understood that by rotating the shaft 20 in either direction the nuts 24 traverse the cross rail 26 upwardly or downwardly in the frame.

Cross rail 26 carries a plunger or former 27$^a$ for preliminarily shaping the cavity within the pot or crucible being formed. This former may be of any material, such as cast iron or the like, and is bolted or otherwise secured directly to the bottom of the cross rail 26. It also carries a scraper or shoe 28, which is of the proper configuration to shape the rim of the pot or crucible.

To form a pot blank shaft 20 is rotated in the proper direction until the cross rail 26 is at or near the upper limit of its movement. Mold casing 8, with the bottom 14 and wall segments 16$^a$ therein, is placed in position on the upper end of shaft 4. The lining 16 may also be placed upon the bottom 14 if desired. A mass of moist clay sufficient to form the blank is introduced into the mold and preferably tamped down. Drive shaft 7 is then started and the mold, together with the mass of clay therein, is rotated on a vertical axis. Shaft 20 is then rotated in the proper direction to move the cross rail 26 and former 27 downwardly. As the former enters the mold cavity it engages the mass of clay and the rotation of the mold around the non-rotatable former spins or forces the clay outwardly and upwardly into the space between the outer wall of the former and the inner wall segments 16$^a$ of the mold. The machine is operated until the cross rail 26 moves downwardly sufficiently to spread the clay upwardly into contact with the trimming shoe or shaper 28, which shapes the rim of the pot blank. At this time, if the proper quantity of clay has been used, the distance between the bottom of the former 27$^a$ and the bottom of the mold will be substantially the same as the desired thickness of the bottom of the pot.

After the blank has been preliminarily formed in the manner just described, shaft 20 is rotated in the reverse direction to withdraw the former from the mold. The mold is then bodily removed from the molding machine and a cover 30 is placed thereon, as shown in Fig. 2. Cover 30 is provided with a plurality of circumferentially spaced radial slots 30$^a$ to receive the locking bolts 13$^a$ of the mold. A gasket 32 is also laid in place between the rim of the mold and the cover. The nuts on locking bolts 13$^a$ are then turned down to tightly seal the blank in the mold.

Cover 30 is provided with two pipe connections 33 and 34, the first being at one side and the other near the center of the cover. Pipe 33 communicates with the cavity within the hollow blank, and also, through a cut-off valve 35, with any suitable source of suction, such as a vacuum pump or the like. Pipe 34 communicates with a three-way valve 36 and also with the space within an expansible bag or bladder 37, formed of flexible material, such as rubber or the like, and which, when the cover is in place on the mold, lies within the cavity in the pot blank.

The three-way valve 36 comprises a casing 38 having a tapered bore to receive a tapered valve member or plug 39. The valve casing is provided with three ports, to-wit, port 40 leading to a pipe 41 communicating with a source of suction, port 42 leading to a pipe 43 communicating with a source of pressure, and port 44 leading to a pipe 45 communicating with the open air. All three ports are in the same plane transverse to the axis of the plug 39. The valve casing is also provided, in a different plane with a fourth port 46, to which the pipe 34 is connected. Plug 39 is provided with an annular passage 47 in the same plane with the port 46, and also with a longitudinal passage 48 extending down through said plug and opening outwardly in the plane of the ports 40, 42 and 44. The valve has four positions in which the lower end of the passage 48 registrates with the three ports 40, 42, 44, or with the blank wall of the casing, thereby enabling communication to be established from the pipe 34 to a source of suction, a source of compression or to the open air, or to be cut off entirely.

The connection between the other end of pipe 34 and the expansible bag 37 is shown in Fig. 5. Preferably, and as shown, cover 30 is provided with an opening to receive an externally threaded sleeve 50 having a rim or flange 51 resting against a gasket 52 lying in a groove on the under side of the cover. The small end 53 of the expansible bag 37 is clamped within sleeve 50 by an inner sleeve member 54. Threaded upon sleeve 50 is a second sleeve 55 which is screwed down against a gasket 56 lying in a groove on the outside of the cover. The flanged end of pipe 34 is clamped against a gasket 57 by a union or nut 58.

After the cover 30 is locked in position upon the mold, valve 35 in pipe 33 is opened to exhaust the air from the space between the bag 37 and the inner surface of the pot blank. Valve 36 is turned to the proper position to open communication from the pipe 34 to the source of suction, so that air is also exhausted from within the bag 37. It is preferred, however, to exhaust the air from within the bag 37 to a lesser degree than from the space between said bag and the pot blank, so that the difference of pressure within and outside of the bag will cause it to expand slightly, as shown in Fig. 2, and hold the clay in place. This difference of pressure is so regulated that the bag merely expands sufficiently to fill the hollow cavity within the pot blank and thereby entirely free the inner surface of the blank from contact with the air. As the air is exhausted from the space between the blank and the bag 37 any bubbles of air or other gases occluded in the material of the blank expand and escape from the blank and pass out through the pipe 33. Also, if there is an excess of water or other liquid in the material of the blank the decrease in pressure so lowers the vaporizing point that part of the liquid expands into vapor and also passes out through the pipe 33. The blank is therefore entirely freed of all bubbles of air and from part of the moisture contained therein, the amount remaining being determined by the amount of vacuum applied. The bag 37 expands until it touches the inner surface of the pot blank, but without exerting pressure thereon, and prevents the inner surface of the blank from blistering or swelling under the decrease in pressure.

After it is certain that all of the air or gas bubbles contained in the pot blank have been withdrawn, valve 35 is closed and valve 36 is moved to a position opening communication between the pipe 43 leading to a source of pressure and pipe 34. Air is thereupon forced into the bag 37, creating pressure therein, so that the bag exerts a yielding and uniform pressure upon the inner surface of the pot blank proportioned to the degree of pressure admitted to the bag. The bag 37 is formed of flexible rubber or the like so that the fluid pressure therein acts equally upon all portions of the blank contacted by the bag. As a result the blank is compressed or compacted equally throughout and any cavities therein left by the exhaustion of air through the pipe 33 are closed up by flow of the plastic material under the air pressure.

When the pressure within the bag 37 has been increased to the proper amount valve 36 may be turned to its blank position, thereby trapping the pressure within the bag 37, or the pressure may be left on full. The blank is allowed to lie in the mold under this pressure for an appreciable period, say twenty-four hours, more or less, to enable the plastic clay to flow under pressure and assume a perfectly homogeneous condition. During all of this time the bag 37 is in contact with the inner surface of the blank, which is consequently out of contact with the air and is prevented from absorbing or occluding bubbles of air or other gas. If desired the vacuum may be maintained in the narrow cavity.

When a reasonable time has elapsed sufficient to thoroughly and uniformly compact the entire mass of clay, the nuts on the bolts 13$^a$ are loosened and cover 30 and bag 37 are removed. The mold with the blank therein is then placed upon a jigging machine, where the mold is rotated about the blank axis. A smoothing tool or implement, or even the hand, is then applied to the inner surface of the blank to smooth or trim the same to symmetrical shape. A plunger is then introduced through the opening 10 in the bottom of the mold to force out the blank, the several mold sections 16$^a$, and the bottom 14. The mold sections 16$^a$ are removed one by one and the pot blank is severed or sliced from the bottom 14 with a wire or the like. The outer surface of the blank is then smoothed or trimmed in any manner, as by hand, or in the same manner as the inner surface. As soon as it has dried sufficiently to permit, it is placed upon a tray or other support and laid aside to dry, after which it is arched in the usual manner.

Preferably, a multiple system is used, such as that shown in Fig. 8, which illustrates a plurality of covers 30 connected up in parallel to the same sources of pressure and exhaust. A multiple system of such covers enables a number of blanks to be operated upon at the same time, the separate molds containing the different blanks being detached from the covers as rapidly as the blanks are finished.

The method described enables pot blanks of any shape or size to be formed of homogeneous texture and in such manner as to prevent the formation of cavities or airholes in the pot which might render the pot liable to breakage during burning. The method requires only simple apparatus, which can be applied in connection with apparatus now in use for molding pots. The pots formed have a much longer life than those formed according to prior methods and their cost is only slightly more.

While the improved method of making plastic articles has been illustrated and described particularly for the manufacture of glass melting pots, it will be understood that the method can be applied to the manufacture of any plastic article where density and homogeneity are desirable, and the claims hereinafter made are to be understood as not confined to the specific article illustrated and described unless this is specifically mentioned in the claim, it being the intention to claim the invention in its widest application and to cover its use wherever the improved results obtained warrant the additional expense involved.

What I claim is:—

1. The method of making clay pots or crucibles, consisting in inclosing a shaped hollow moist blank within an air-tight impervious mold with one surface of said blank in contact with said mold and subjecting its other surface to a partial vacuum to thereby free the blank from air bubbles or occluded gas.

2. The method of making clay pots or crucibles, consisting in inclosing a shaped hollow moist blank within an air-tight impervious mold with its entire outer surface in contact with said mold and withdrawing the air from the hollow cavity within the blank, thereby expanding air or gas bubbles contained within the blank and withdrawing them therefrom.

3. The method of making clay pots or crucibles, consisting in inclosing a shaped hollow moist blank within an air-tight impervious mold with its entire outer surface in contact with said mold and subjecting the inner surface of said blank to a vacuum to thereby free the blank from air bubbles or occluded gas, and then subjecting the inner surface of said blank to uniform yielding pressure to compact the blank.

4. The method of making clay pots or crucibles, consisting in inclosing a shaped hollow moist blank within an air-tight mold and subjecting it to a partial vacuum to thereby free the blank from air bubbles or occluded gas and excess moisture, and subjecting the entire inner surface of the blank to uniform yielding pressure to thereby compact the blank equally throughout.

5. The method of making clay pots or crucibles, consisting in inclosing a shaped hollow moist blank within an air-tight mold and subjecting it to a partial vacuum to thereby free the blank from air bubbles or occluded gas and excess moisture, subjecting the entire inner surface of the blank to uniform yeilding pressure to thereby compact the blank equally throughout, and allowing the blank to lie under pressure until it becomes thoroughly homogeneous.

6. The method of making clay pots or crucibles, consisting in inclosing a shaped moist blank within an air-tight mold and subjecting it to a vacuum to thereby free the blank from air bubbles or occluded gas, and subjecting the inner surface of the blank while out of contact with the air to yielding pressure to thereby compress or compact the same uniformly throughout.

7. The method of making clay pots or crucibles, consisting in inclosing a shaped hollow moist blank within an air-tight mold and subjecting it to a vacuum to thereby free the blank from air bubbles or occluded gas, subjecting the entire inner surface of the blank while out of contact with the air to uniform yeilding pressure to thereby compact the blank uniformly throughout, and allowing the blank to lie under pressure for an appreciable period to thereby cause the material to flow and equalize strains and stresses therethrough.

8. The method of making clay pots or crucibles, consisting in preliminarily shaping a hollow blank in a mold cavity, subjecting the inner surface of said blank while in said cavity to a vacuum to thereby free the blank from air bubbles or occluded gas, and thereafter subjecting the inner surface of the blank to pressure to compact the same.

In testimony whereof, I have hereunto set my hand.

HALBERT K. HITCHCOCK.

Witnesses:
J. L. TREFALLER, Jr.,
C. B. SANDERSON.